(No Model.)

G. F. SELLSTROM.
MEAT SAW.

No. 473,130. Patented Apr. 19, 1892.

WITNESSES:
L. E. Harris.
L. M. Thomas.

INVENTOR
Gustaf F. Sellstrom
BY M. Harris
ATTORNEY.

UNITED STATES PATENT OFFICE.

GUSTAF FABIAN SELLSTROM, OF JAMESTOWN, NEW YORK.

MEAT-SAW.

SPECIFICATION forming part of Letters Patent No. 473,130, dated April 19, 1892.

Application filed December 8, 1890. Serial No. 373,988. (No model.)

*To all whom it may concern:*

Be it known that I, GUSTAF FABIAN SELLSTROM, a citizen of the United States, residing at Jamestown, in the county of Chautauqua and State of New York, have invented certain new and useful Improvements in Meat-Saws; and I do hereby declare the following to be a full, clear, and exact description of the invention, such as will enable others skilled in the art to which it appertains to make and use the same.

The object of my invention is to provide a more efficient means of straining a saw and holding the same in a frame; and the improvement is considered to possess advantages over Patent No. 411,475 granted to me September 24, 1889, and will be fully understood by this specification and the accompanying drawings, in which—

Figure 1:
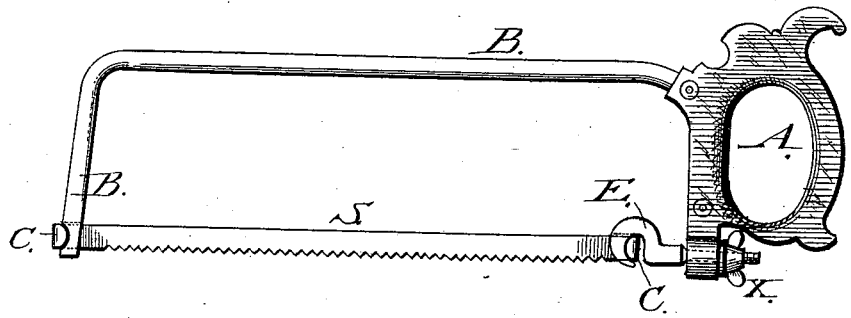
Figure 2:
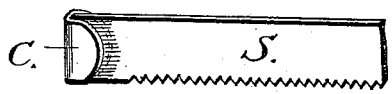
Figure 3:
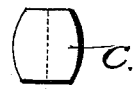
Figure 4:

Figure 1 is a side elevation of a saw. Figs. 2, 3, and 4 are detail views of ends of saw with piece to be attached thereto.

In meat-saws it is found very desirable to be able to strain the saw equally its entire width, and to accomplish this different methods have been employed, some of which are found objectionable when the saw is put to hard usage, as the frame is liable to get out of line with the end fixtures on the saw, all of which is fully overcome by my improvements.

In the drawings, A and B represent the saw-frame, made in the usual form, except that the concave at the end of the frame is cut in the outer face of the slotted outer end, as shown.

E is a yoke, held in the frame by suitable means, having a circular end that passes across the saw S, as shown in Fig. 1, the inner circle fitting the projections C on the end of the saw-blade.

C is a metal blank (shown in Fig. 4) having convex ends, and is folded onto the ends of saw-blade and securely fastened thereto, and should be of sufficient thickness to form a strong end support for straining the saw.

One end of the saw is put into the slot at the end of the saw-frame, the end piece C fitting the concave in the end of the frame, the other end passing into the slot of the yoke and fitting the concave of the yoke, as shown in Fig. 1, and with the tension-screw X any desired strain is put upon the saw, the strain being equal to the entire width of the blade.

I claim—

In combination with a saw-blade provided at each end with lugs having inner convex tension-bearings extending across its width, a saw-frame provided at the outer end with a slot to receive the blade and a concave on its outer face to receive the convex lugs on one end of the saw, the other end of the frame provided with an adjustable yoke having a concave surface to receive the lugs at the other end of the saw, the yoke having suitable means to give any desired tension to the blade, substantially as shown, and for the purpose set forth.

In testimony whereof I affix my signature in presence of two witnesses.

GUSTAF FABIAN SELLSTROM.

Witnesses:
 MILO HARRIS,
 OTTO T. CARLSON.